(No Model.)
D. T. DENTON.
CLUTCH.
No. 481,010. Patented Aug. 16, 1892.
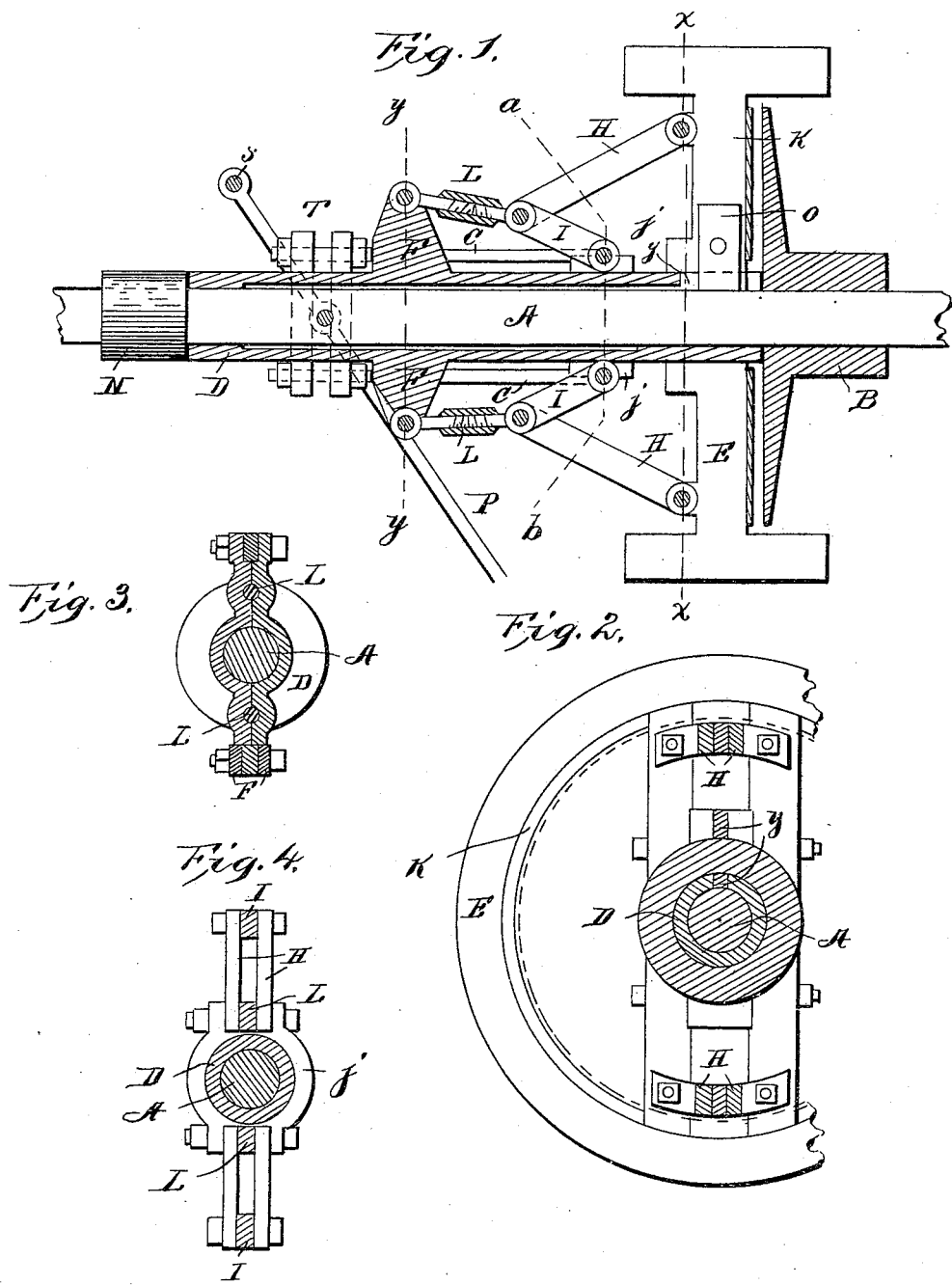
WITNESSES:
E. C. Duffy
Chas. M. Werle
INVENTOR
D. T. Denton
BY O. E. Duffy
ATTORNEY.

UNITED STATES PATENT OFFICE.

DANIEL T. DENTON, OF DULUTH, MINNESOTA.

CLUTCH.

SPECIFICATION forming part of Letters Patent No. 481,010, dated August 16, 1892.

Application filed November 7, 1891. Serial No. 411,229. (No model.)

*To all whom it may concern:*

Be it known that I, DANIEL T. DENTON, a citizen of the United States, residing at Duluth, (Lakeview P. O.,) State of Minnesota, have invented a new Improvement in Friction-Clutches, of which the following is a specification.

This invention relates to certain improvements in friction-clutches.

The object of the invention is to provide an improved friction-clutch exceedingly strong, durable, and effective in construction and wherein the friction-faces may be held in contact without exerting longitudinal or endwise pressure on the shaft and wherein the clutch-gear is idle and does not rotate when thrown out of gear or out of frictional contact, thus enabling the operator to make adjustments or alterations or repairs without stopping the rotation of the shaft.

The invention consists in certain novel features of construction and in combinations of parts, more fully described hereinafter, and particularly pointed out in the claims.

Referring to the accompanying drawings, Figure 1 is a longitudinal sectional view of the present invention, showing the pulley thrown out of gear with the drive-shaft. Fig. 2 is a cross-sectional view on the line X X, Fig. 1, with parts broken away; and Figs. 3 and 4 are respectively cross-sectional views on the lines Y Y and A A, Fig. 1.

In the drawings, reference-letter A indicates the drive-shaft.

B indicates the friction-disk, rigidly secured to the drive-shaft by means of a hub or other suitable devices. The friction-disk, it should be observed, constantly rotates with the shaft.

N indicates the hub, rigid on the shaft and a distance from the inner or engaging face of said disk. A sleeve D is located on the shaft between the frictional disk and the collar N. This sleeve is of such length as to extend from the collar N to disk B, which prevents longitudinal movement thereof; but it is so mounted on the shaft as to permit independent rotation of the shaft within the sleeve. The pulley E is mounted on the inner end of this sleeve adjacent to the friction-disk and is provided with the friction-face K to frictionally engage said disk to drive the pulley therefrom. This pulley is mounted on the sleeve so as to rotate therewith and so as to permit a limited longitudinal movement of the pulley on the sleeve. This is attained by a key O, secured in the pulley and projecting into the longitudinal slot Y in the sleeve. The pulley is preferably a split pulley, as shown. Key O is clamped in the hub thereof by the bolts which unite the pulley. Fulcrum-arms F F project radially and oppositely from the sleeve near its other end and are rigidly secured to and form a part of the sleeve. Between the fulcrum-arms F F and the pulley E a loose sliding ring $j$ is located on the sleeve D. Toggle-links H I are pivoted, respectively, to the pulley and to the sliding ring $j$. Links L are pivoted, respectively, to the ends of the fulcrum-arms F and to the joints of said toggle-links, and these links L are formed in sections united by threaded couplings, so that they can be adjusted in length to vary the throw of the toggle-links.

T indicates the shifting-hub, loosely located on the sleeve D between the collar N and the arms F. Rigid rods C are secured to shifting-hub T and to ring $j$ and pass loosely through or between the arms F.

P indicates the shifting or operating lever, fulcrumed at a fixed point S and between its ends having a projection extending into the groove of the shifting hub T.

When the lever P is swung in one direction, it will move the hub T longitudinally of the sleeve D, and will thereby, through the medium of rods C, move the ring $j$ in the same direction and expand the toggle-links, so as to throw the pulley into engagement with the disk B, and thereby rotate the pulley and parts of the clutch from and with the shaft A. When the lever P is swung in the opposite direction, the hub T is moved oppositely and drives with it the ring $j$, and thereby contracts the toggle-links, so as to draw the pulley on the sleeve D from engagement with the friction-disk B, thereby throwing the clutch and pulley out of operative adjustment, and the sleeve D and all parts carried thereby will remain at rest, while the shaft A rotates within the same.

The portions of the clutch when out of gear are thus at rest and can be adjusted or repaired or otherwise operated upon without stopping the rotation of the shaft A, and, furthermore, the parts of the clutch are not injured and worn out by constant rotation with the shaft A, whether the pulley be in or out of gear. The friction-disk B and pulley E may be provided with conical or V-shaped faces arranged to intermesh where additional frictional power is required.

The whole clutch and frictional device can be constructed in halves or sections when used with the split pulley, thus enabling it to be placed on the shaft without removing the shaft.

Having thus fully described my invention, what I claim, and desire to secure by Letters Patent of the United States, is—

1. In combination, the shaft, a friction-disk rigid therewith, a sleeve between said disk and a stop, in which sleeve the shaft is free to turn, a pulley rotating with and capable of a limited longitudinal movement on the end of the sleeve into and out of contact with the disk, toggle-links and their supports, and operating means carried by said sleeve for moving said pulley, whereby the pulley, sleeve, and operating means remain at rest when the pulley is disengaged from the disk, as described.

2. In combination, a shaft, the rigid friction-disk thereon, a sleeve on the shaft in which the same can freely turn and held against longitudinal movement on the shaft, said sleeve provided with a longitudinal slot at the inner end, a pulley mounted on said inner end of the sleeve and provided with a key extending into said slot, whereby the pulley rotates with the sleeve and has a limited longitudinal movement toward or from the friction-disk, and the operative parts of the clutch carried by said sleeve and connected to throw the pulley, substantially as described.

3. In a friction-clutch, the combination of the shaft, the friction-disk rigid thereon, a sleeve loosely mounted on the shaft, a split pulley on one end of the sleeve mounted to turn with the sleeve and having limited longitudinal movement on the sleeve toward or from said disk, toggle-links connected to the pulley and to the loose ring on said sleeve, fulcrum-arms rigid with the sleeve and connected to the joints of the links, and the shifting hub connected to said ring, the sleeve and arms being formed in sections, so that they can be secured on the shaft with the split pulley, in the manner and for the purposes described.

DANIEL T. DENTON.

Witnesses:
JOHN CURRIE,
CORA R. CLEMENS.